Nov. 21, 1961 — O. ALEXANDER — 3,009,224
CABLE CLAMP

Filed April 22, 1959 — 2 Sheets-Sheet 1

INVENTOR.
OREN ALEXANDER
BY
*Harold B. Hood*
ATTORNEY

Nov. 21, 1961  O. ALEXANDER  3,009,224
CABLE CLAMP
Filed April 22, 1959  2 Sheets-Sheet 2

INVENTOR.
OREN ALEXANDER
BY
Harold B. Hood
ATTORNEY

# United States Patent Office 3,009,224
Patented Nov. 21, 1961

3,009,224
CABLE CLAMP
Oren Alexander, 4735 Geneva Ave., Lawrence, Ind.
Filed Apr. 22, 1959, Ser. No. 808,259
2 Claims. (Cl. 24—126)

The present invention relates to a cable clamp, and more particularly to a device which, with a minimum of special parts and at minimum cost, is capable of retentively engaging a cable or similar flexible element for any one of a number of desired purposes.

The primary object of the invention is to provide a device, comprising an integral block formed with one or more primary bores for the individual reception of cable portions, and provided with novel means for engaging a cable portion positioned in such bore, effectively to resist any stress tending to shift that cable portion longitudinally with respect to the block.

A further object of the invention is to provide, in a device of the character above-described, a novel form of cable-gripping element, for use with such a block, such element comprising a pin seated in a secondary bore intersecting the primary bore and having a face, eccentric with respect to the common axis of the pin and the secondary bore, which engages a cable in the primary bore, said pin being oscillably shiftable about that common axis, in response to minute axial movement of the cable portion within the primary bore, to intensify the force of engagement between the pin and the cable portion.

Further objects of the invention will appear as the description proceeds.

To the accomplishment of the above and related objects, my invention may be embodied in the forms illustrated in the accompanying drawings, attention being called to the fact that the drawings are illustrative only, and that change maybe made in the specific constructions illustrated and described, so long as the scope of the appended claims is not violated.

Figure 1:
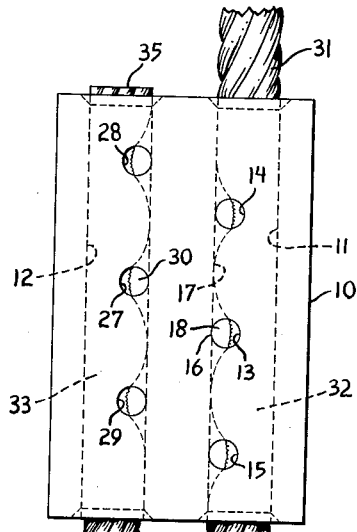
FIG. 1 is a front elevation of one form of clamp constructed in accordance with the present invention, and showing a fragment of a cable gripped in said clamp.
Figure 2:
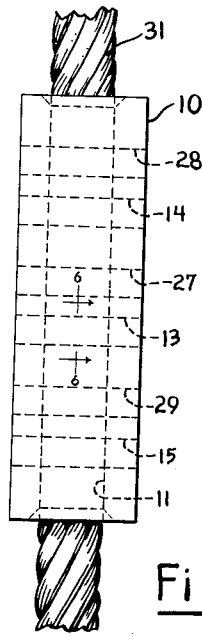
FIG. 2 is a side elevation viewed from the right-hand side of FIG. 1.

Referring more particularly to FIGS. 1 to 6, it will be seen that my improved clamp comprises a solid, integral block 10 of any suitable material which will be selected with due regard for the type of strand with which it is to be used and the kinds of stress to which it will be subjected in use. In the illustrated embodiment of the invention, the block 10 is formed with a first primary bore 11 and with a second primary bore 12, said bores being formed on laterally spaced, substantially parallel axes and opening through opposite ends of the block 10. It will be apparent that, in some applications of the principles of the present invention, only a single primary bore (which may, if desired, be a socket with one closed end) will be required and that, in other applications, it may be desirable to provide more than two primary bores.

A secondary bore 13 is formed in the block 10 upon an axis which is transverse with respect to the axis of the primary bore 11, and the bore 13 intersects the bore 11, so that, through a portion of its length, the bore 13 opens into the bore 11. In the preferred form of my invention, the axis of the bore 13 is so located that, in the plane which includes the axis of the bore 11 and is perpendicular to the axis of the bore 13, that wall of the bore 13 which is most remote from the axis of the bore 11 is tangent, at the point 16, to the adjacent wall of the bore 11. If desired, and preferably, additional secondary bores such as those illustrated at 14 and 15 are arranged in a similar relationship to the bore 11; and each such secondary bore is adapted to receive snugly a pin 18.

Each pin 18 is generally cylindrical, but it tapered from one end 20 toward the opposite end thereof by the formation of an inclined face 19 which preferably extends substantially from the end 20 of the pin to a point 21 near the opposite end of the pin, the pin being beveled as at 22 from the point 21 to its tip 23.

Figure 5:
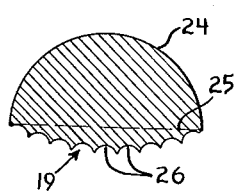
FIG. 5 is a section taken substantially on the line 5—5 of FIG. 3, and drawn to an enlarged scale.
Figure 6:
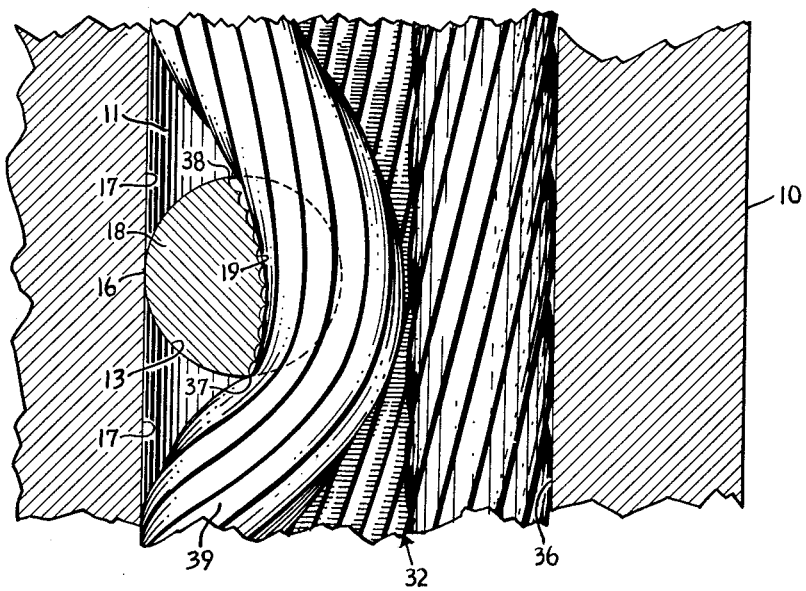
FIG. 6 is a fragmentary section, to a greatly enlarged scale, taken substantially on the line 6—6 of FIG. 2.

The face 19 may, in some applications, be flat; but preferably it will be generally arcuate, as is clearly shown in FIGS. 5 and 6, but its curvature is substantially less than that of the main body of the pin. That is, the radius of curvature of the face 19 is much longer than the radius of curvature of the opposite face 24 of the pin. Preferably, but not necessarily, the pin face 19 is longitudinally fluted as at 26.

Figure 3:
FIG. 3 is an enlarged front elevation of a pin of novel characteristics, forming an element of the present invention.
Figure 4:
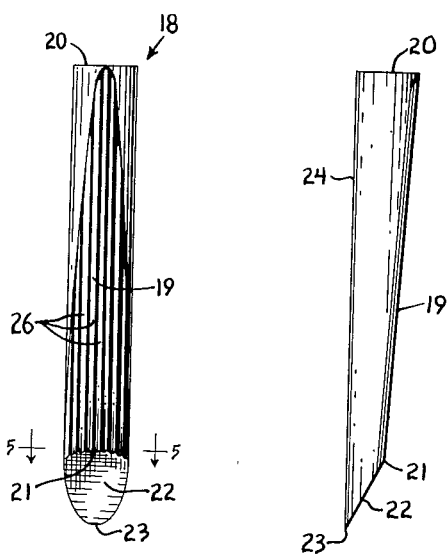
FIG. 4 is a side elevation thereof viewed from the left of FIG. 3.

In the optimum form of my invention, the face 19 merges directly with face 24 of the pin; and, as will be clearly seen from FIGS. 3 and 4, the peripheral extent of the long-radius face 19 increases gradually from the end 20 to the point 21 of the pin. However, it should not extend beyond the end of a diametrical chord 25.

Each pin is proportioned and designed to be received, with a snug, rolling fit, in its secondary bore, for instance, 13, with its surface 24 bearing against that portion of the bore wall which is remote from the axis of the associated primary bore.

Similar secondary bores 27, 28 and 29 are similarly arranged with respect to the primary bore 12 and are adapted to receive pins 30 which are identical with the pins 18.

Where it is desired to provide a dead block for a cable 31 or, for any reason, to form a stable bight in a cable, such a cable will be threaded through the primary bore 11 to locate a cable portion 32 within that bore, will then be rebent and will be threaded in the opposite direction through the primary bore 12 to locate a portion 33 therein, thus forming a bight 34 of desired proportions. Eihter before or after location of the cable portion 33, pins 18 will be driven into the bore 13 and into such other secondary bores, such as 14 and 15, as may be provided. In that operation, the tip 23 of a pin will be entered in one open end of, for instance, the bore 13 and the pin will be pressed home as far as possible by manual manipulation and then may be driven into the secondary bore with a hammer, of the like. As the tip of the pin enters that portion of the bore 13 which opens into the bore 11, the beveled surface 22 of the pin will engage a strand, such as 39 (FIG. 6) of composite cable 32, and through cam action, will distort and displace that strand, generally in the manner illustrated in FIG. 6. As the pin is driven home, any additional strands of the cable which may be engaged by the surface 22 will be similarly distorted. The pin will be driven deeply into its bore and until, in most instances, its tip emerges through the opposite end of its bore. Thus, the long-radius surface 19 will intimately engage the adjacent portion of the cable. After the pin has been fully driven home, its opposite ends may be cut off flush with the opposite faces of the block 10. Preferably the length of the pin will substantially exceed the thickness of the block, whereby the angle of inclination of the face 19 will be minimized; and usually it will be necessary to cut off both ends of the pin after it has been seated.

In a similar fashion, pins 30 are driven into the bore 27 and into any other bores such as 28 and 29 which may be provided, similarly to engage the cable portion 33.

It will be appreciated that, even when the face 19 is disposed with its lateral termini 37 and 38 equally spaced from the wall 17 of the bore 11, the tapered pins 18 or 30 will strongly resist any force tending to move the cable longitudinally within the bore 11. However, as has been stated, the pins are so seated in their secondary bores that they are capable of a rolling or oscillatory movement about the axes of those bores. Therefore, if any such force does succeed in producing even the slightest movement of the cable section 32 upwardly, as viewed in FIG. 1, relative to the block 10, the engagement of the fluted surface 19 with the cable will cause the pin 18 to turn toward, for instance, the position in which it is illustrated in FIG. 6, in which the "corner" 37 has moved toward the axis of the bore 11, or toward the wall 36 thereof remote from the point 16. It will be apparent, thus, that any slightest movement of the cable will produce a rolling movement of the pins such as to cause the pins to bite more heavily into the cable and to clamp the cable more straitly within the bore 11.

Figure 7:
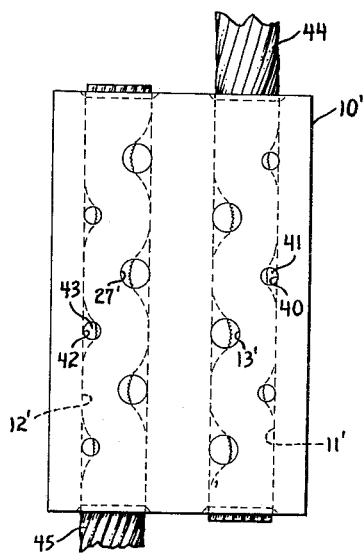
FIG. 7 is a view similar to FIG. 1 but showing a modified form of clamp and fragments of two cables gripped therein, whereby the clamp becomes a splice.

In FIG. 7, I have shown a modified form of clamp comprising a block 10′ which includes all of the features of the block 10 and which is further provided with one or more further secondary bores such as that indicated at 40, intersecting the primary bore 11′ and with one or more further secondary bores such as that indicated at 42 intersecting the primary bore 12′. The bores 40 and 42 are preferably arranged in tangential relation to the walls of the primary bores which are opposite the walls with which the secondary bores 13′ and 27′ are associated, and are offset longitudinally of the primary bores, with respect to the secondary bores 13′ and 27′. Preferably, the bores 40 and 42 are of smaller diameter than the bores 13′ and 27′; and pins 41 and 43 are provided for insertion in the bores 40 and 42, said pins being identical in construction with the pins 18 and 30, except that their diametrical dimensions conform to the diameters of the bores with which they are associated. Obviously, the provision of the further secondary bores and the pins therefor provides an even tighter grip on the cable sections with which the clamp is associated, and produces a serpentine configuration of the gripped cable sections.

Furthermore, in FIG. 7, I have suggested the use of the clamp as a splicer for separate cables 44 and 45. It will be obvious, of course, that the form of clamp illustrated in FIGS. 1 to 6 may be used in a similar manner, and that the form of clamp illustrated in FIG. 7 may be used in the manner illustrated in FIG. 1.

The expression "oscillably seated," as used herein, is intended to mean "so positioned and supported as to be capable of oscillation."

I claim as my invention:

1. In a device of the class described, a block formed with a first primary bore and a second primary bore extending through said block on substantially parallel axes, a first cable portion disposed in one of said primary bores and projecting from one end thereof, a second cable portion disposed in the other of said primary bores and projecting from one end thereof, said block further being formed with a secondary bore for each primary bore, each secondary bore being substantially cylindrical in cross section, formed on an axis which is transverse with respect to the axis of its associated primary bore, and eccentrically intersecting its associated primary bore, and a pin for each secondary bore, each such pin being snugly received in its corresponding secondary bore and having a cross-sectional shape comprising a part-circular portion oscillably seated against that portion of the wall of its secondary bore which is most remote from the axis of the associated primary bore and a portion of less curvature than said first-named portion exposed within the associated primary bore and there frictionally engaging the cable portion located in such primary bore, the peripheral dimension of said portion of less curvature being a maximum closely adjacent one end of said pin and progressively decreasing toward the other end of said pin and said pin being formed as an entering wedge at said one end thereof.

2. A device of the class described comprising a body having a primary bore extending therethrough for the reception of a portion of a cable disposed in said bore, said body further being formed with a secondary bore, said secondary bore being substantially cylindrical in cross section, formed on an axis which is transverse with respect to the axis of said primary bore, and eccentrically intersecting said primary bore, and a pin snugly receivable in said secondary bore, said pin being progressively tapered to one extremity thereof and the cross-sectional shape of said pin comprising a part-circular portion oscillably seated against that porton of the wall of said secondary bore which is most remote from the axis of said primary bore and a portion of less curvature than said first-named portion exposed within said primary bore and adapted frictionally to engage one side of a portion of a cable disposed in said primary bore, said body further being formed with a further secondary bore substantially cylindrical in cross section, formed on an axis transverse with respect to the axis of said primary bore, and eccentrically intersecting said primary bore on the side of said primary bore axis opposite the point of intersection of said first-named secondary bore and offset therefrom longitudinally of such primary bore axis, and a further axially-tapered pin snugly receivable in said futher secondary bore, the cross-sectional shape of said further pin comprising a part-circular portion oscillably seated against that portion of the wall of said further secondary bore which is most remote from the axis of said primary bore and a portion of less curvature than said first-named portion exposed within said primary bore and adapted frictionally to engage the opposite side of a portion of a cable disposed in said primary bore.

References Cited in the file of this patent

UNITED STATES PATENTS

| | | |
|---|---|---|
| 81,311 | Way | Aug. 18, 1868 |
| 295,803 | Pitney | Mar. 25, 1884 |
| 546,585 | Dibb et al. | Sept. 17, 1895 |
| 896,053 | Bouchard et al. | Aug. 11, 1908 |
| 1,320,691 | Holland | Nov. 4, 1919 |
| 1,496,630 | Hendrickson | June 3, 1924 |